(12) United States Patent
Pate

(10) Patent No.: US 7,133,201 B2
(45) Date of Patent: Nov. 7, 2006

(54) COMPENSATING DISPLAY SURFACE

(75) Inventor: Michael A. Pate, Tuscon, AZ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 134 days.

(21) Appl. No.: 10/609,791

(22) Filed: Jun. 26, 2003

(65) Prior Publication Data

US 2004/0263963 A1    Dec. 30, 2004

(51) Int. Cl.
G03B 21/56 (2006.01)
G02F 1/153 (2006.01)
G09G 5/00 (2006.01)
G09G 3/34 (2006.01)
H04N 5/64 (2006.01)
H04N 9/31 (2006.01)

(52) U.S. Cl. .............. 359/443; 359/449; 359/453; 359/267; 359/459; 359/460; 345/591; 345/593; 345/1.2; 345/84; 348/744

(58) Field of Classification Search ............. 359/443, 359/449, 452–453, 267, 459–460; 345/600, 345/581, 591, 593, 1.1–1.2, 84; 348/739, 348/744; 362/231

See application file for complete search history.

(56) References Cited

U.S. PATENT DOCUMENTS

| 6,529,322 | B1 * | 3/2003 | Jones et al. ............... 359/443 |
| 6,680,579 | B1 * | 1/2004 | Allen et al. .............. 315/169.3 |
| 6,707,516 | B1 * | 3/2004 | Johnson et al. .............. 349/78 |
| 6,769,774 | B1 * | 8/2004 | McDowell .................. 353/84 |
| 2003/0227577 | A1 * | 12/2003 | Allen et al. ............... 348/742 |
| 2003/0231260 | A1 * | 12/2003 | Pate et al. ................ 348/744 |
| 2004/0012849 | A1 * | 1/2004 | Cruz-Uribe et al. ....... 359/449 |
| 2004/0071310 | A1 * | 4/2004 | Sharma et al. ............ 382/100 |
| 2004/0212546 | A1 * | 10/2004 | Dixon et al. .............. 345/1.1 |

* cited by examiner

Primary Examiner—W. B. Perkey
Assistant Examiner—Magda Cruz

(57) ABSTRACT

A display system is provided that includes a light source configured to project an image, and a display surface configured to receive the projected image and at least partially compensate for a non-ideal spectral power distribution exhibited by the light source.

22 Claims, 3 Drawing Sheets

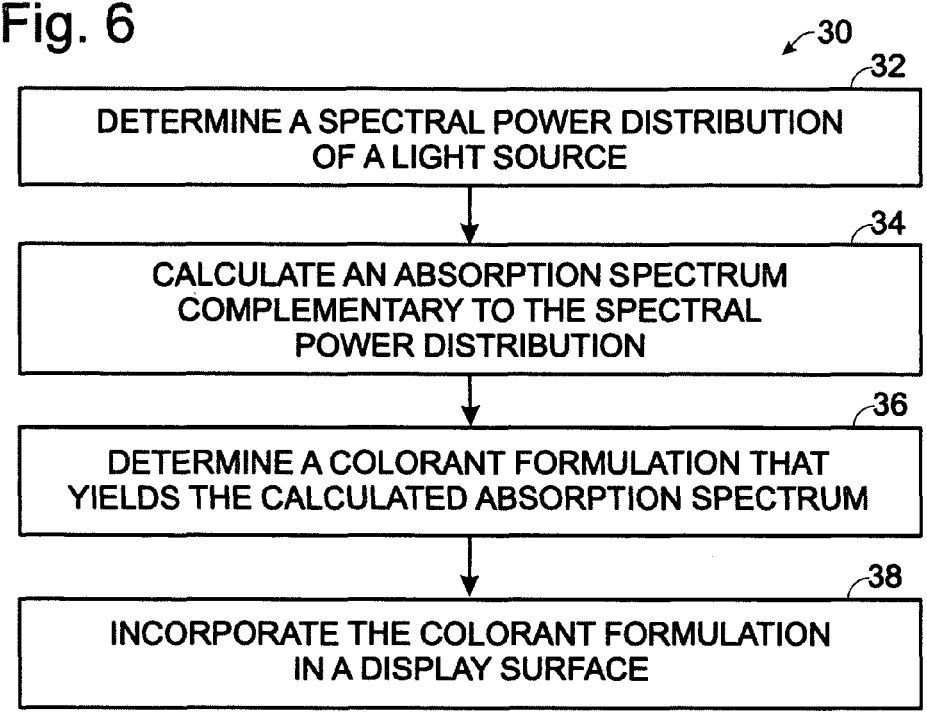
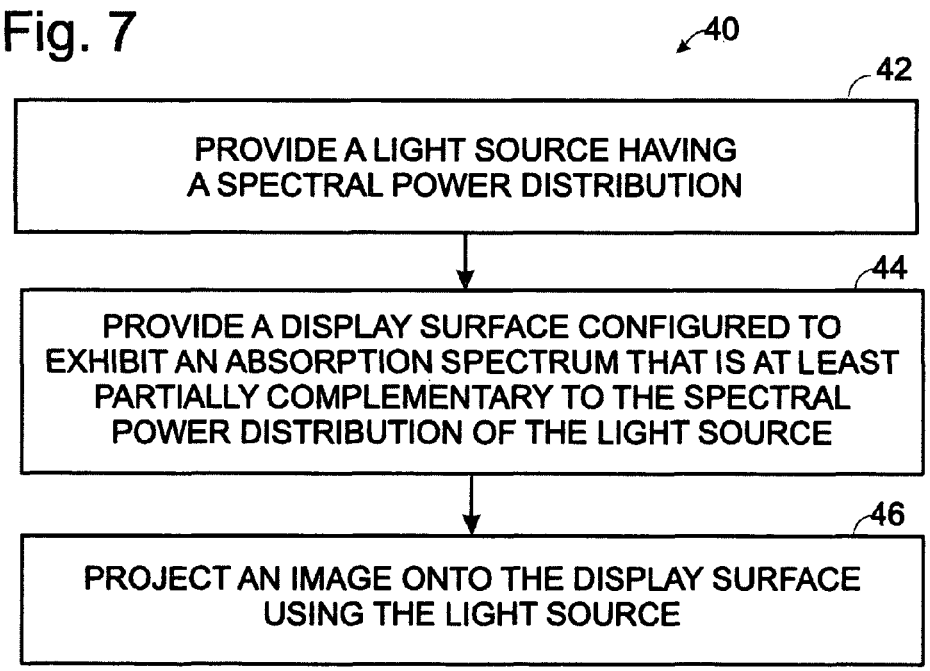

US 7,133,201 B2

COMPENSATING DISPLAY SURFACE

BACKGROUND

Image projection systems may be used to display a still or video image, or to enable the image to be viewed simultaneously by a large or small audience. Although such projection systems are intended to produce image color and brightness as faithfully as possible, such fidelity may be limited by, among other factors, a light source having a less than ideal spectral power distribution.

Spectral power distribution is a measurement of the luminous flux of light emitted by a light source, as a function of the wavelength (and therefore the color) of the light. An ideal light source may exhibit a uniform emission intensity at each wavelength across the visible spectrum. Unfortunately, light sources typically offer non-ideal spectral power distributions, that is, emission intensity may vary as a function of wavelength. For example, some incandescent lamps may emit proportionally more lower frequency red and orange light than higher frequency blue and violet light. Similarly, some discharge lamps (such as fluorescent lamps, sodium vapor lamps, or mercury vapor lamps) may exhibit very narrow emission bands in the visible region. In some cases, the discharge lamp may emit significant radiation in the nonvisible ultraviolet region. Such lamps may incorporate rare earth phosphor coatings capable of absorbing high frequency emissions and re-emitting light at lower frequencies, such as in the red region. However, such lamps may still exhibit highly nonuniform spectral power distributions.

Attempts to compensate for non-ideal light sources may include the use of color filters to decrease projected blue and green wavelengths relative to red wavelengths. For example, where the projector incorporates a sequential R,G,B,W color wheel, a proportionally larger segment of the color wheel may be used to transmit red light, relative to the size of the green and blue color wheel segments, to compensate for weaker red wavelength emissions. However, such solutions typically serve to decrease the total amount of light capable of being projected by the light engine. In addition, such compensating mechanisms may increase the cost and weight of the projector system, and in the case of the rapidly spinning color wheel, contribute to the acoustic noise of the projector's operation.

SUMMARY

A display system is provided that includes a light source configured to project an image, and a display surface configured to receive the projected image and at least partially compensate for a non-ideal spectral power distribution exhibited by the light source.

BRIEF DESCRIPTION OF THE DRAWINGS

FIG. 6 is a flowchart depicting a method of making a color-compensating projection screen, according to an embodiment of the invention.

FIG. 7 is a flowchart depicting a method of compensating for a light source having a non-ideal spectral power distribution, according to an embodiment of the invention.

DETAILED DESCRIPTION

Figure 1:
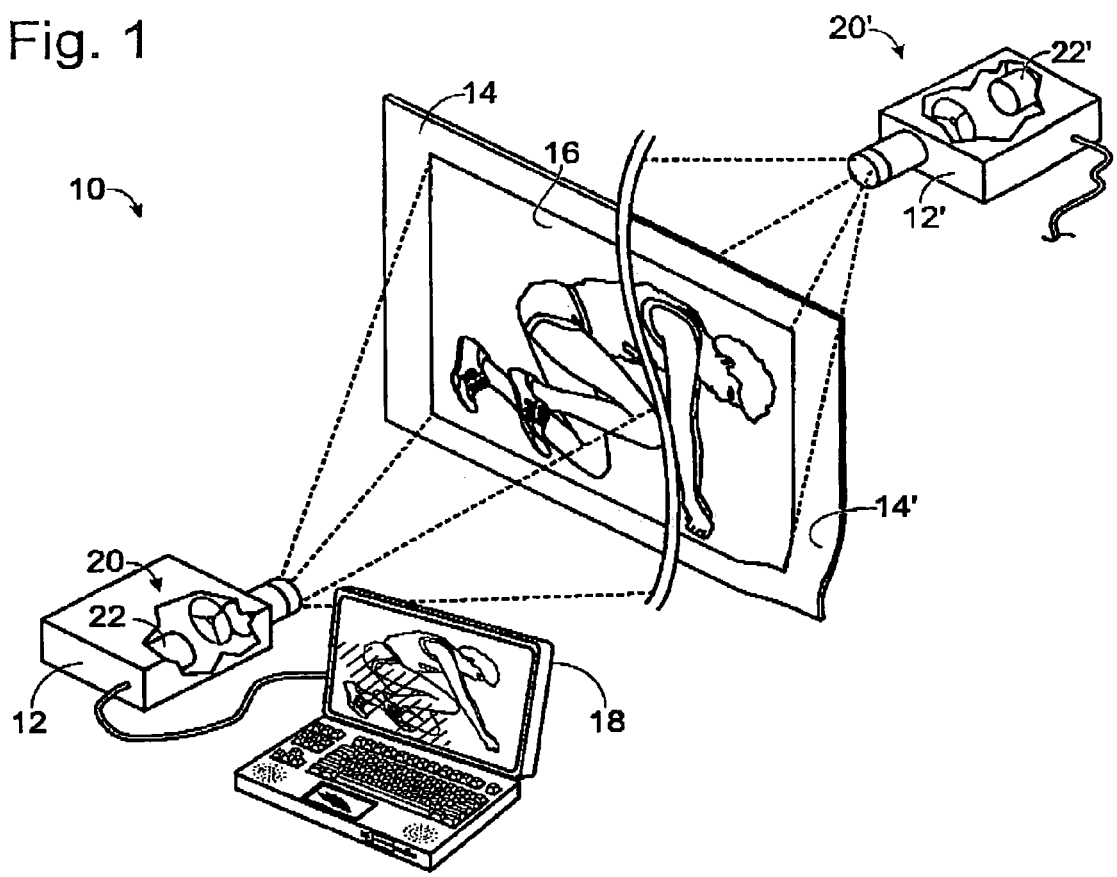
FIG. 1 is a view of a display system employing a display surface configured to at least partially compensate for non-ideal spectral power distribution according to an embodiment of the invention.

Referring initially to FIG. 1, a display system according to an embodiment of the present invention is shown generally at 10. The display system typically includes a projector 12 and a display surface 14, which takes the form herein of a projection screen 14 having differential absorption. Projector 12 is adapted to project an image 16 onto screen 14. The projector is typically associated with a source of image data, for example, an associated processor, depicted in FIG. 1 as a laptop computer 18. Projector 12 thus may be configured to project an image 16 corresponding to image data received from computer 18 onto projection screen 14.

Projector 12 is depicted as a front projection system, however many types of projection systems may be suitable for use with the display system of the invention, including both front and rear projection devices. In a front projection system as shown in FIG. 1, the viewer typically is located on the same side of the screen as the projector. In a rear projection system, the viewer typically is located on the opposite side of the screen as the projector, and the projected image is viewed through an at least partially light transmissive screen (for example as shown in U.S. patent application Ser. No. 10/020,112, filed Dec. 14, 2001, hereby incorporated by reference). Such a rear projection system also is illustrated in FIG. 1 via projector 12' which is configured to projset an image onto the rear ot transrnissive screen 14'.

The projector may take the form of a digital projector, or any other suitable projection device. Projector 12 typically includes a light engine 20, which may be configured to produce and direct light to projection screen 14 so as to generate a projected image that corresponds to the image data received from computer 18. For example, and as described in more detail below, light engine 20 may include a suitable illumination source 22 adapted to optically address projection screen 14. Similarly, projector 12' typically includes a light engine 20', with a light source 22' configured project an image on the rear of display surface 14'.

The white light source may be a single white light source or multiple white and/or color light sources. Selected single light sources may include, among others, metal halide lamps, xenon lamps, halogen lamps, mercury vapor lamps, plasma lamps, and incandescent lamps. Multiple light sources may include, among others, light emitting diodes (LEDs) and laser diodes (or arrays of such solid state light sources). Additionally, projector 12 may include optics, spatial light modulators, scanning mirrors, focusing devices, color-generation devices, controllers, etc. The images projected by the image projector may include still images or video images. Both still and video images will be referred to herein simply as projected images.

Figure 2:
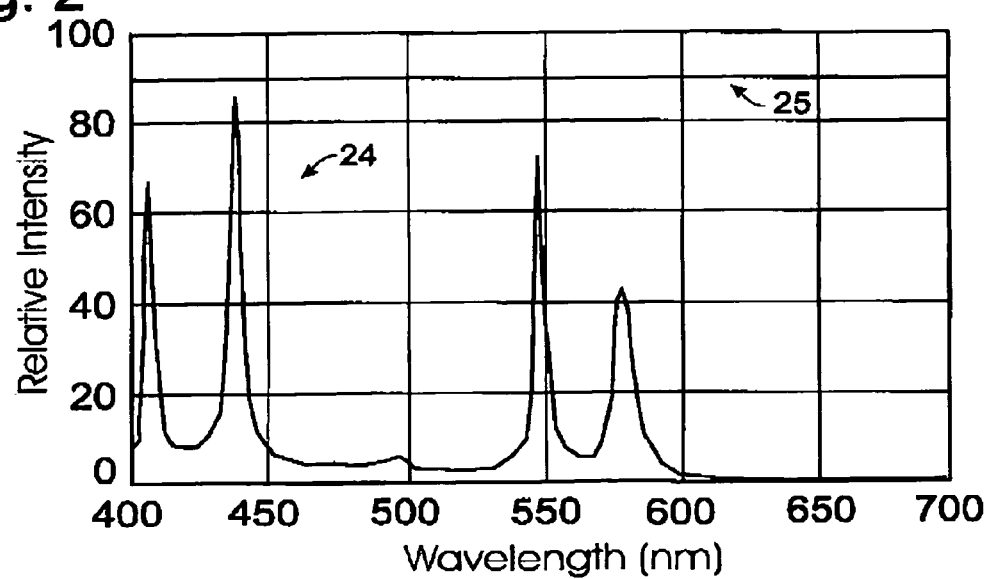
FIG. 2 is a representative spectral power distribution of a projection lamp, showing a non-ideal spectral power distribution.

Light source 22 of light engine 20 typically exhibits a spectral power distribution, or SPD. The spectral power distribution corresponds to the relationship between the emission intensity of light source 22 and the wavelength of the light emitted. The spectral power distribution may include one or more strong emission regions, or multiple wavelengths of enhanced output. A spectral power distribution 24 between the wavelengths of 400 nm and 700 nm for a representative light source is depicted in FIG. 2. As shown in FIG. 2, spectral power distribution 24 exhibits strong peak emissions in the blue-violet (400–450 nm) and green (500–550 nm) regions, and weaker emission in the orange and red regions (600–700 nm). These strong peak emission may be referred to as local maxima, or as wavelengths of enhanced output. The wavelengths of enhanced output may include wavelengths that are not adjacent. As discussed above, light engine 20 may incorporate filters or other mechanism for compensating for a non-ideal spectral power distribution such as spectral power distribution 24. However, the resulting output of the light engine may still deviate from an ideal spectral power distribution 25, that exhibits an equal emission intensity at every wavelength.

The display surface may be configured so that it differentially absorbs wavelengths of light corresponding to the wavelengths of enhanced output (e.g., wavelengths corresponding to the peak emissions depicted in FIG. 2). That is, the display surface may be configured to absorb more light at wavelengths of enhanced output than light at other wavelengths. Such a display surface may be said to exhibit a complementary absorption spectrum, relative to the spectral power distribution of the light source used to generate the incident light. The display surface may be configured to exhibit a complementary absorption spectrum throughout the visible region of the electromagnetic spectrum, for example, including wavelengths from about 380 nm to about 780 nm. The display surface of the display system may be configured to at least partially compensate for a non-ideal spectral power distribution of light source 22. Alternatively, the display surface may be configured to at least substantially compensate for the nonideal spectral power distribution of light source 22.

Figure 3:
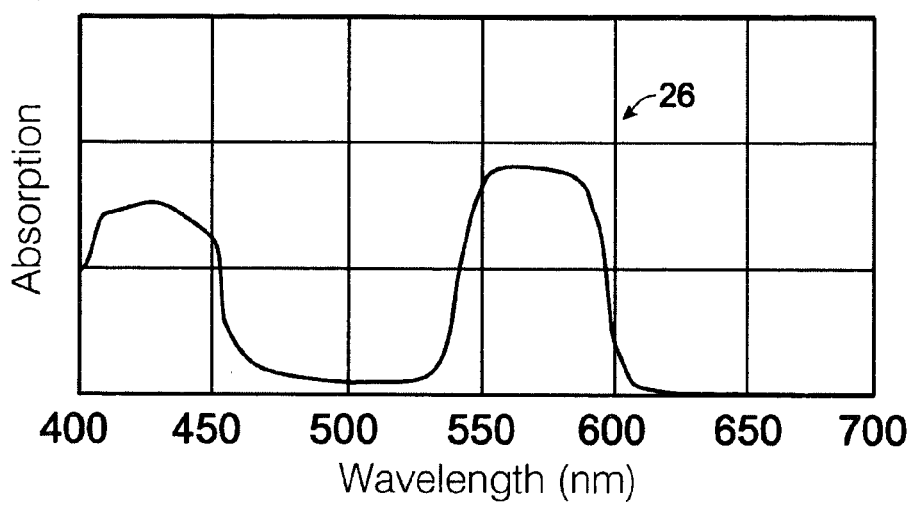
FIG. 3 is a representative absorption spectrum of a display surface according to an embodiment of the invention, the display surface selected to at least partially compensate for the non-ideal spectral power distribution of FIG. 2.

In the case of reflective projection screens used in conjunction with front projection display systems, the incident light may be differentially reflected, with absorption of at least some wavelengths of maximum output. In the case of transmissive projection screens used in conjunction with rear projection systems, the incident light may be differentially transmitted, with differential absorption of at least some wavelengths of maximum output. For example, where the display surface is selected to at least partially compensate for spectral power distribution 24 of FIG. 2, the display surface may exhibit an absorption spectrum 26, as shown in FIG. 3. That is, the display surface may be 'tuned' by incorporation of selected colorants or chromophores (including dyes and/or pigments) so that the display surface absorbs more light in the green and blue light regions, and absorbs less light in the red regions.

Figure 4:
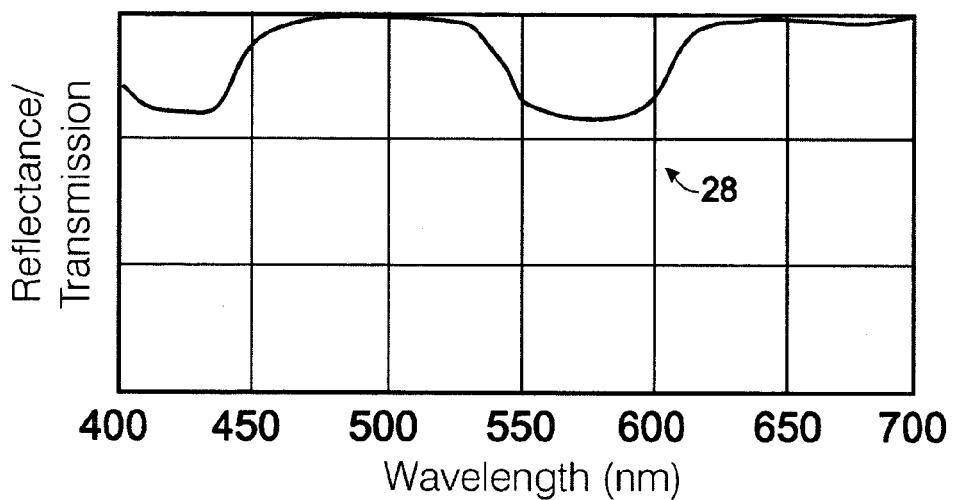
FIG. 4 is a representative reflectivity spectrum of a display surface, according to an embodiment of the invention, the display surface selected to at least partially compensate for the non-ideal spectral power distribution of FIG. 2.

The optical characteristics of a reflective display surface may also be stated in terms of the reflectivity of the display surface. For example, a display surface selected to at least partially compensate for spectral power distribution 24 may exhibit a reflectivity spectrum represented by plot 28, as shown in FIG. 4. Similarly, optical characteristics of a transmissive display may be stated in terms of the transmissivity of the display surface. Such transmissivity also may be represented by plot 28 in FIG. 4.

The optical characteristics of the display surface may be tuned by the addition of one or more colorants to a display surface substrate. The display surface substrate may exhibit a base color, such that the combination of one or more colorants with the substrate yield a display surface having a complementary absorption spectrum. The display surface may be prepared by the addition of one colorant to the substrate, the addition of two colorants to the substrate, or the addition of a more complex blend of colorants to the substrate. The combination of substrate and added colorant may differentially absorb light at one or more wavelengths of maximal output of the light source used.

Figure 5:
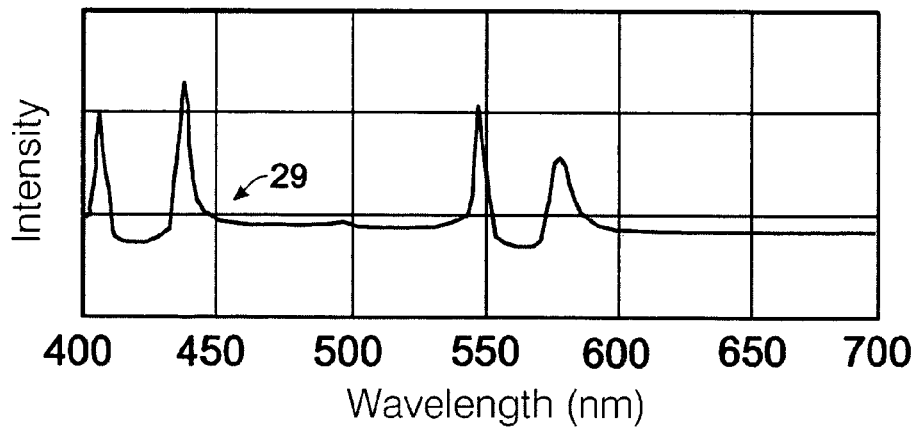
FIG. 5 is a representative spectrum of light having the spectral power distribution of FIG. 2 after interaction with display surface of FIG. 3.

The projection of light from a light source exhibiting spectral power distribution 24 onto a surface having optical characteristics such as are shown in FIG. 3 or FIG. 4 may produce a reflected (or transmitted) image having a spectral power distribution that is more homogeneous than that exhibited by spectral power distribution 24, for example as shown as shown spectrum 29 of FIG. 5, corresponding to the idealized reflectance spectrum resulting from the interaction of light having a spectral power distribution 24 of FIG. 2 after interaction with a display surface having an absorption spectrum 26 as shown in FIG. 3.

The appropriate combination of colorants needed to create a display surface having the appropriate optical characteristics may be determined by a color matching system. Such a color matching system may include a spectrophotometer and a processor. Once a light source for which color-compensation is desired is identified, a spectral power distribution of the light source may be measured using the spectrophotometer. From the spectral power distribution, a complementary absorption spectrum may be determined. Although the complementary absorption spectrum may be selected to exhibit fine spectral structure, the determination of the complementary absorption spectrum typically will include some smoothing in order to compensate for narrow emission bands in the spectral power distribution of the light source (as shown in FIG. 2). The absorption spectrum may also be normalized relative to a maximal absorption desired for the resulting display surface. That is, a user may be unlikely to utilize a permanent display surface having an unpleasant surface coloration, regardless of the advantages in color-correction offered by such a surface. The particular absorption spectrum of the display surface may therefore be selected to differ somewhat from a perfectly complementary absorption spectrum for aesthetic reasons, as part of the determination process. It should be appreciated that a suitable complementary reflectance or transmission spectrum may also be determined, and that such a determination is included in the scope of the present disclosure.

Once a suitable complementary absorption spectrum is obtained, a number and concentration of colorants may be selected, typically from a database of colorants selected for their suitability for incorporation in a display surface. In particular, a subset of colorants may be selected by the processor or by a skilled user that, in the specified combination and proportions, may absorb light in the spectral regions where the measured light source spectral power distribution is strong, and/or reflect (or transmit) strongly at wavelengths where the light source spectral power distribution is weak.

Where software is used for the colorant selection process, the software algorithms that may be used may be divided into two regimes: colorant selection and colorant proportions. From a database of available colorants, a subset, or combination of colorants may be selected that results in a close spectral match to the calculated complementary absorption spectrum. The determined colorant profile may also include relative amounts of each colorant, based on an appropriate color mixing model. The colorant formulation may include one, two, or more colorants.

An initial colorant formulation may exhibit a substantially complementary absorption spectrum. Alternatively, the first colorant formulation may offer a greater or lesser degree of calorimetric error. Therefore, the colorant selection process may include an iterative spectral matching algorithm, followed by a colorimetric matching algorithm to insure a close match with the determined complementary absorption spectrum. Such an iterative process may be particularly useful where multiple-colorant combinations are called for.

The method of making a color-compensating projection screen, substantially as described above, is set out in flowchart 30 of FIG. 6. The illustrated method includes determining a spectral power distribution for a light source at 32, determining an absorption spectrum complementary to the spectral power distribution at 34, determining a colorant formulation that yields the calculated absorption spectrum at 36, and incorporating the colorant formulation in the display surface at 38.

As discussed above, different types of light sources may offer different spectral power distributions. It should be apparent that a display surface tailored to complement the spectral power distribution of a single light source may not adequately complement the spectral power distribution of another light source. In addition, the spectral power distribution of an individual lamp may vary over time. It therefore may be useful to design a display surface that generally complements the spectral power distributions of an assortment of light sources. For example, mercury vapor lamps typically exhibit brighter output in the blue and green visible regions, and weaker output in the red regions. A display surface that is generally highly reflective in the red region, and somewhat less reflective in the blue and green regions may therefore offer enhanced color fidelity for a wide variety of light engines that may utilize mercury vapor lamps.

The display surfaces described herein may include a generally planar substrate, as is typically the case for projection displays. However, the display surface may include virtually any shape or configuration of color-correcting surface, including curved forms. The display surface may include a generally rigid substrate 14, or alternatively, the substrate may be a flexible substrate 14'. Where the substrate is flexible, the display surface may be configured to be rolled up for transportation or storage, such as for a portable projection screen, or a projection screen that may be raised and lowered. Even where the substrate is generally rigid, the resulting projection screen may be configured to be portable, such as for use in tradeshows or other presentations.

It should be appreciated that the display systems described herein are well-suited for use in a method of at least partially compensating for a light source having a non-ideal spectral power distribution, as set out in flowchart 40 of FIG. 7. The illustrated method includes providing a light source having a non-ideal spectral power distribution at 42, providing a display surface configured to exhibit an absorption spectrum that is at least partially complementary to the spectral power distribution at 44, and projecting an image onto the display surface using the light source at 46.

While various alternative embodiments and arrangements of a color-correcting display surface have been shown and described above, it will be appreciated by those of skill in the art that numerous other embodiments, arrangements, and modifications are possible. In other words, those skilled in the art will understand that many variations may be made therein without departing from the spirit and scope defined in the following claims. The present description should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring, nor excluding two or more such elements.

What is claimed is:

1. A display system, comprising:
   a light source configured to project an image; and
   a display surface configured to receive the projected image and at least partially compensate for a non-ideal spectral power distribution of the light source.

2. The display system of claim 1, where the display surface is configured to at least substantially compensate for the non-ideal spectral power distribution of the light source.

3. The display system of claim 1, where the light source is associated with a light engine of a projector.

4. A display system, comprising:
   a light source configured to project an image; and
   a display surface configured to receive the projected image and at least partially compensate for a non-ideal spectral power distribution of the light source, where the display surface at least partially compensates for the non-ideal spectral power distribution of the light source by differential color absorption.

5. The display system of claim 4, where the light source is configured to project the image on the front of the display surface.

6. The display system of claim 4, where the light source is configured to project the image on the rear of the display surface.

7. A display system, comprising:
   a light source configured to project an image; and
   a display surface configured to receive the projected image and at least partially compensate for a non-ideal spectral power distribution of the light source, where the non-ideal spectral power distribution includes one or more wavelengths of enhanced output, and the display surface includes colorant selected to absorb visible light within at least one wavelength of enhanced output.

8. The display system of claim 7, where the non-ideal spectral power distribution includes multiple wavelengths of enhanced output that are not adjacent.

9. A projection screen, comprising a display surface configured to receive an image projected by a light source having a non-ideal spectral power distribution that includes one or more wavelengths of enhanced output, where the display surface at least partially compensates for the non-ideal spectral power distribution by differentially absorbing light within at least one wavelength of enhanced output.

10. The projection screen of claim 9, where the display surface is configured to reflect the projected image.

11. The projection screen of claim 9, where the display surface is configured to transmit the projected image.

12. The projection screen of claim 9, where the one or more wavelengths of enhanced output ranges within a visible wavelength range of between approximately 380 nm and approximately 780 nm.

13. The projection screen of claim 9, where the display surface differentially absorbs light of at least one wavelength of enhanced output.

14. The projection screen of claim 9, where the display surface includes a rigid substrate.

15. The projection screen of claim 9, where the display surface includes a flexible substrate.

16. The projection screen of claim 9, where the projection screen is a portable projection screen.

17. A method of making a color-compensating projection screen, comprising:
    determining a spectral power distribution of a light source;
    determining an absorption spectrum complementary to the spectral power distribution; and
    providing a display surface that exhibits an absorption spectrum at least substantially corresponding to the calculated absorption spectrum.

18. A method of making a color-compensating projection screen, comprising:
    determining a spectral power distribution of a light source:
    determining an absorption spectrum complementary to the spectral power distribution; and
    providing a display surface that exhibits an absorption spectrum at least substantially corresponding to the calculated absorption spectrum, wherein providing the display surface includes determining a colorant formulation that exhibits an absorption spectrum that at least substantially matches the calculated absorption spectrum and incorporating the colorant formulation in the display surface.

19. The method of claim 18, where incorporating the colorant combination includes incorporating at least two colorants in the display surface.

20. A method of compensating for a light source having a non-ideal spectral power distribution, comprising;
    providing a display surface configured to exhibit an absorption spectrum that is at least partially complementary to the non-ideal spectral power distribution; and
    projecting an image onto the display surface using the light source.

21. A display system, comprising:
    means for projecting an image;
    means for receiving the projected image;
    means for at least partially compensating by the means for receiving for a non-ideal spectral power distribution of the means for projecting.

22. A display system. comprising:
    means for projecting an image;
    means for receiving the projected image;
    means for at least partially compensating by the means for receiving for a non-ideal spectral power distribution of the means for projecting, where the means for at least partially compensating for a non-ideal spectral power distribution includes applying colorant to the means for receiving the projected image to effect differential color absorption of the projected image.

* * * * *

UNITED STATES PATENT AND TRADEMARK OFFICE
CERTIFICATE OF CORRECTION

| | | |
|---|---|---|
| PATENT NO. | : 7,133,201 B2 | Page 1 of 1 |
| APPLICATION NO. | : 10/609791 | |
| DATED | : November 7, 2006 | |
| INVENTOR(S) | : Pate | |

It is certified that error appears in the above-identified patent and that said Letters Patent is hereby corrected as shown below:

Col. 7 (line 22), delete "source:" and insert therefor --source;--.

Signed and Sealed this

Fourteenth Day of August, 2007

JON W. DUDAS
*Director of the United States Patent and Trademark Office*